United States Patent
Narayanan et al.

(10) Patent No.: US 8,041,942 B2
(45) Date of Patent: Oct. 18, 2011

(54) ROBUST PEER-TO-PEER NETWORKS AND METHODS OF USE THEREOF

(75) Inventors: Sathya Narayanan, Plainsboro, NJ (US); Eunsoo Shim, West Windsor, NJ (US)

(73) Assignee: Panasonic Corporation, Osaka (JP)

( * ) Notice: Subject to any disclaimer, the term of this patent is extended or adjusted under 35 U.S.C. 154(b) by 1443 days.

(21) Appl. No.: 11/515,842

(22) Filed: Sep. 5, 2006

(65) Prior Publication Data

US 2008/0072037 A1     Mar. 20, 2008

(51) Int. Cl.
*H04L 29/06*     (2006.01)

(52) U.S. Cl. .......................... 713/156; 713/173

(58) Field of Classification Search .................. 713/156, 713/157, 173
See application file for complete search history.

(56) References Cited

U.S. PATENT DOCUMENTS

| | | | |
|---|---|---|---|
| 6,816,900 B1* | 11/2004 | Vogel et al. .................... | 709/225 |
| 7,051,102 B2* | 5/2006 | Gupta et al. .................... | 709/226 |
| 7,068,789 B2* | 6/2006 | Huitema et al. ............... | 380/277 |
| 7,136,927 B2* | 11/2006 | Traversat et al. .............. | 709/230 |
| 7,162,544 B2* | 1/2007 | Ohkawa et al. ................ | 709/251 |
| 7,206,841 B2* | 4/2007 | Traversat et al. .............. | 709/225 |
| 7,240,210 B2* | 7/2007 | Mihcak et al. ................. | 713/180 |
| 7,251,694 B2* | 7/2007 | Gupta et al. .................... | 709/226 |
| 7,254,608 B2* | 8/2007 | Yeager et al. ................... | 709/203 |
| 7,275,102 B2* | 9/2007 | Yeager et al. ................... | 709/224 |
| 7,299,351 B2* | 11/2007 | Huitema et al. ............... | 713/156 |
| 7,308,496 B2* | 12/2007 | Yeager et al. ................... | 709/224 |
| 7,383,433 B2* | 6/2008 | Yeager et al. ................... | 713/157 |
| 7,401,152 B2* | 7/2008 | Traversat et al. .............. | 709/230 |
| 7,401,216 B2* | 7/2008 | Arkko et al. ................... | 713/153 |
| 7,444,372 B2* | 10/2008 | Gupta et al. .................... | 709/203 |
| 7,519,726 B2* | 4/2009 | Palliyil et al. ................. | 709/232 |
| 7,660,853 B2* | 2/2010 | Scott et al. ..................... | 709/205 |
| 7,680,930 B2* | 3/2010 | Gupta et al. .................... | 709/224 |
| 2002/0065919 A1* | 5/2002 | Taylor et al. ................... | 709/226 |
| 2002/0087733 A1* | 7/2002 | Ohkawa et al. ................ | 709/251 |
| 2002/0188657 A1* | 12/2002 | Traversat et al. .............. | 709/201 |
| 2003/0028585 A1* | 2/2003 | Yeager et al. ................... | 709/201 |
| 2003/0056094 A1* | 3/2003 | Huitema et al. ............... | 713/157 |
| 2003/0204742 A1 | 10/2003 | Gupta et al. | |
| 2004/0015689 A1* | 1/2004 | Billhartz ........................ | 713/156 |
| 2004/0054807 A1 | 3/2004 | Harvey et al. | |
| 2004/0088369 A1* | 5/2004 | Yeager et al. ................... | 709/217 |
| 2004/0133640 A1* | 7/2004 | Yeager et al. ................... | 709/204 |
| 2004/0153458 A1 | 8/2004 | Noble et al. | |
| 2005/0060395 A1* | 3/2005 | Korotky ......................... | 709/223 |
| 2005/0086300 A1* | 4/2005 | Yeager et al. ................... | 709/204 |
| 2005/0091529 A1 | 4/2005 | Manion et al. | |
| 2005/0207382 A1* | 9/2005 | Hirashima et al. ............. | 370/338 |
| 2005/0240591 A1 | 10/2005 | Marceau et al. | |

(Continued)

OTHER PUBLICATIONS

Stoica, Chord: A Scalable Peertopeer Lookup Service for Internet Applications, Aug.27-31, 2001, ACM, SIGCOMM.*

(Continued)

*Primary Examiner* — David Garcia Cervetti
(74) *Attorney, Agent, or Firm* — RatnerPrestia

(57) ABSTRACT

A method of authentication of peers of a peer-to-peer network includes a certificate issuer tracking at most a predetermined number of node IDs for each peer on the peer-to-peer network, a requesting peer requesting from the certificate issuer a certificate for authenticating a communicating peer and each certificate issued listing at least one node ID of the predetermined number of node IDs assigned for the communicating peer.

25 Claims, 10 Drawing Sheets

U.S. PATENT DOCUMENTS

| | | |
|---|---|---|
| 2005/0267992 A1 | 12/2005 | Huitema et al. |
| 2006/0149806 A1* | 7/2006 | Scott et al. .................... 709/201 |
| 2007/0113096 A1* | 5/2007 | Zhu et al. ...................... 713/180 |
| 2007/0121570 A1* | 5/2007 | Takeda et al. ................ 370/348 |
| 2007/0266251 A1* | 11/2007 | Busser et al. ................. 713/176 |
| 2008/0052237 A1* | 2/2008 | Busser et al. ................... 705/50 |
| 2008/0130516 A1* | 6/2008 | You et al. ..................... 370/254 |
| 2008/0205399 A1* | 8/2008 | Delesalle et al. ............. 370/392 |
| 2009/0037566 A1* | 2/2009 | Hoile et al. ................... 709/223 |
| 2009/0316687 A1* | 12/2009 | Kruppa ......................... 370/352 |

OTHER PUBLICATIONS

Secure Hash Standard, www.itl.nist.gov/fipspubs/fip180-1., Apr. 17, 1995, pp. 1-18.

* cited by examiner

ROBUST PEER-TO-PEER NETWORKS AND METHODS OF USE THEREOF

FIELD OF THE INVENTION

The present invention relates to the field of distributed networks generally and, in particular, to a robust peer-to-peer network and methods of use of the robust peer-to-peer network.

BACKGROUND OF THE INVENTION

Peer-to-peer networks (P2P) have become increasingly popular with their primary application being file-sharing. Others are using P2P networks for communication, such as Skype® which has implemented a voice over Internet protocol (VoIP) P2P telephone service. Such networks are designed with a decentralized management structure in which peers cooperate in functions of the P2P network and other distributed applications such as file-sharing and backup applications, among many others. If malicious peers exist on the P2P network, they can: (1) sabotage routing of messages; (2) hoard (or corner) node IDs; and/or (3) bombard the P2P network with signaling traffic. For example, a malicious peer can sabotage routing by dropping messages which disrupts the operation of the P2P network or, otherwise, redirect the routing of messages within the P2P network.

Nodes neighboring the malicious peer are particularly susceptible to damage. By claiming a large number of node IDs, the malicious peer may prevent legitimate peers from joining the P2P network, thereby allowing the malicious node to hoard or corner the portion or portions of the P2P network. Such hoarding or cornering may amplify the impact of routing sabotage.

A malicious peer may generate a large amount of P2P signaling traffic such as lookup requests or placement of resource requests, that may cause congestion in the P2P network. Further, the malicious peer may cause routing tables of legitimate peers (e.g., peers which are not malicious) to become corrupted.

SUMMARY OF THE INVENTION

The present invention is embodied in a method of authentication of peers of a peer-to-peer network. The method includes a certificate issuer tracking at most a predetermined number of node IDs for each peer on the peer-to-peer network, a requesting peer requesting a certificate for authenticating a communicating peer and each certificate issued listing at least one node ID of the predetermined number of node IDs assigned for the communicating peer.

The present invention is also embodied in a method of verifying that a node ID of a claimant node corresponds to a locator address of the claimant node in a peer-to-peer network using a verifier node. The method includes a claimant node sending a notification message that includes the node ID and locator address of the claimant node. The method further includes the claimant node receiving a first message via a first path of the peer-to-peer network and at least one further message via at least one further path different from the first path and sending a response to the first message and further messages. The method also includes the claimant node receiving another message indicating whether it is authenticated to join the peer-to-peer network.

The present invention is further embodied in a system for verifying that node IDs correspond to locator addresses of nodes in a peer-to-peer network. The system includes a claimant node and a verifier node. The claimant node is configured to send a notification message that includes its node ID and locator address, as a request for a binding placement record. The verifier node is configured to send a first message and at least one further message. The first message is sent via a first path of the peer-to-peer network and the further message is sent via at least one further path, which is different from the first path. The claimant node is configured to send a response to the first and further messages. The verifier node is configured to determine if the response to the first and further messages is correct and, if so, to store the node ID and locator address sent by the claimant node, as a binding check, for use by other nodes of the peer-to-peer network.

The present invention is still further embodied in a method of storing resources on peers in a peer-to-peer network. Each peer manages resources with resource keys in a respective range of a key space. The method includes a first resource key being generated based on a key generation function using a resource name and a resource being stored at a peer in the peer-to-peer network corresponding to the first resource key. The method further includes the resource name being deterministically changed and a further resource key being generated based on the key generation function using the deterministically changed resource name. The method also includes the resource being stored at another peer in the peer-to-peer network corresponding to the further resource key.

The present invention is still further embodied in a method for retrieving resources from peers in a peer-to-peer network. The method includes a plurality of resource keys being generated based on a key generation function using a resource name of a resource to be retrieved and at least one selected peer being determined based on the plurality of generated resource keys. The method further includes a request for the resource to be retrieved being routed to the selected peer through the peer-to-peer network and an availability of the resource at the selected peer being determined. The method also includes at least one other peer being selected and a further request for the resource to be retrieved being routed to the other selected peer, if the resource to be retrieved is not available at the selected peer.

The present invention is still further embodied in a peer-to-peer network with a plurality of peers. The peer-to-peer network includes a first peer and a second peer. The first peer has a first node ID generated by a first node ID generating function and a second node ID generated by a second node ID generating function. The second peer has a third node ID generated by the first node ID generating function and a forth node ID generated by the second node ID generating function such that the first peer communicates with the second peer on the peer-to-peer network using both the first and second node IDs.

The present invention is still further embodied in a multiple topology peer-to-peer network with a plurality of peers. The peer-to-peer network includes a first peer and a second peer. The first peer has a first node ID generated by a first node ID generating function and associated with first and second topologies of the peer-to-peer network. The second peer has a second node ID generated by the first node ID generating function and associated with the first and second topologies. The first and second topologies are different from each other and the first and second peers communicate via links established according to either or both of the first or second topologies.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. Moreover in the drawings, common numerical references are used to represent like features/elements. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Distributed hash tables (DHTs) are used in certain P2P networks to improve efficiency of locating resources. In these networks, a hash key (resource ID) is associated with a resource (e.g., a file) and each node in the system is responsible for storing a certain range of hash keys of a hash space. A lookup for a particular key is routed through the network to the node responsible for the key using a specific routing algorithm. Resources may be stored in a hash table corresponding to their resource ID. Node identifiers (Nodes IDs) are assigned to each node in the P2P network and are mapped to the same hash space as the resource IDs. Typically, in a DHT, resources are assigned to a node having a node identifier (Node ID) that is closest, according to some distance metric, to the resource ID. Details of the methods used to determine the location of the identifiers depend on the particular DHT mechanism being used. For example, each node may be responsible for storing all resources that have a certain range of resource IDs. Nodes may exchange messages in response to a node joining or leaving to maintain the DHTs.

An exemplary Distributed Hash Table (DHT) is defined in an article by I. Stoica et al. entitled, "Chord: A Scalable Peer-To-Peer Lookup Service for Internet Applications," in *ACM SIGCOMM '01*, August 2001. A large scale Chord network may be built, for example, using a huge hash key space such as a set of 128 bit integers and a cryptographic hash function such as the SHA-1 function, defined in a standard entitled "Secure Hash Standard," NIST, FIPS PUB 180-1, April 1995.

Figure 1:
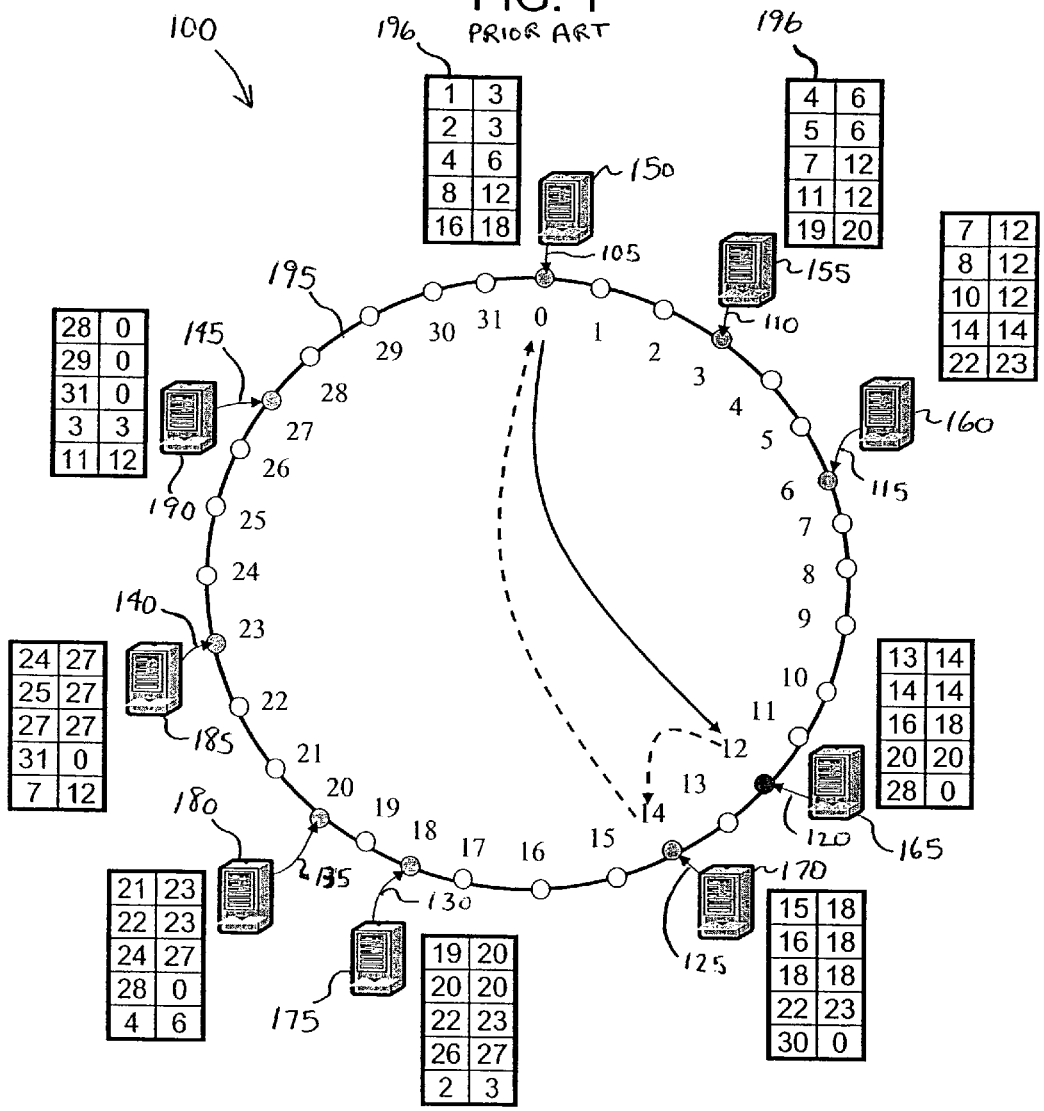
FIG. 1 (Prior Art) is a diagram illustrating a network using a Chord topology.

FIG. 1 (Prior Art) is a diagram illustrating a network using a Chord topology.

Referring now to FIG. 1, exemplary Chord P2P network 100 includes nodes 0-31 and resources (not shown) assigned identifiers from an identifier space. P2P network 100 may include a plurality of physical nodes 105, 110, 115, 120, 125, 130, 135, 140 and 145, a plurality of processors 150, 155, 160, 165, 170, 175, 180, 185 and 190 which communicate with each other via physical nodes 105, 110, 115, 120, 125, 130, 135, 140 and 145 and a physical network 195. Physical network 195 may include any number of physical nodes and corresponding processors. Each processor 150, 155, 160, 165, 170, 175, 180, 185 and 190 may include a part of the DHT (e.g., a routing table 196) and may be uniquely identified by physical network 195. Each processor 150, 155, 160, 165, 170, 175, 180, 185 and 190 may also include other connected resources (not shown).

In the example illustrated, the number of bits assigned to each identifier is 5 and, thus, the identifier space is 0-31. The number of bits, however, may be any number and may be denoted as m. Thus the identifier space may consist of numbers from 0 to $2^m-1$. Modulo $2^m$ is used for numeric operations and thus the identifier space may be ordered in a circular fashion, forming an identifier circle, called a Chord ring. A resource ID is a hash key generated from the name of the resource. As described above, it may be desirable to use a cryptographic hash function such as SHA-1.

A resource with key k may be assigned to the first node having a node ID that is equal to or follows k in the Chord ring. Such a node is called the successor of key k, denoted by successor(k). In the exemplary network, successor(k) is the first node clockwise from k in the Chord ring 100. Predecessor(k) is the first node counter-clockwise from k in the exemplary Chord ring 100. With respect to a particular node, for example node 6, the successor node is node 12 and its predecessor is node 3.

Each node tracks, in a routing table, m other nodes which are called fingers in the Chord topology. The nodes in the finger table are the successors of the nodes $n+2^{i-1}$ for each i=1, ..., m. For any particular node, the nodes identified in its finger table are neighboring nodes, as these nodes are reachable in one hop. Further, a particular node may keep track of its predecessor node. Each node has many entries pointing to nearby nodes, and fewer entries pointing to more remote nodes. These finger tables are populated when a respective node joins the Chord ring 100, and are maintained via communication between various nodes during the operation of Chord ring 100.

In the exemplary network, resource with resource ID k is stored by successor(k). As nodes enter or leave, resources may be stored on different nodes. Thus, information related to the nodes is exchanged as nodes join and leave the network. If a node failure occurs, redundant information maintained in successor and predecessor nodes of the first node may be used to maintain the Chord ring 100.

Communications may be routed based on a characteristic of the finger tables, namely that nodes have more information about nodes (node IDs) closer to them in the identifier space than those further away. When locating a resource with a particular resource ID (e.g., resource ID k), a lookup operation may be used. The node initiating the operation (e.g., a first node) may forward a query to a node from its finger table (e.g., a second node) that is either successor(resource ID) or a node with the largest node ID that is smaller (modulo $2^m$) than k. This process may be repeated, if necessary, from node to node until successor(k) is reached. A finger of node n is successor(k) if the finger is the successor of node $n+2^{i-1}$ for i such that key k is equal to or greater than $n+2^{i-1}$ and the finger's node ID is equal to or greater than key k. That is, if, for a certain i=1 . . . m, $n+2^{i-1} \leq k \leq$ successor $(n+2^{i-1})$, then successor($n+2^{i-1}$) is also successor(k). During the forwarding steps, the query may reach predecessor(k) and thus predecessor(k) forwards the query to successor(k). A node knows it is successor(k) if its predecessor's node ID is not larger than key k (modulo $2^m$) and its node ID is larger than key k. Upon receiving the query, successor(k) replies to the query originator (the first node) with the requested information corresponding to the key if it has the information requested in the query. Otherwise, successor(k) replies to the query originator with a lookup failure message. In a Chord ring that has N nodes, the query reaches successor(k), on average after being forwarded log(N) times. That is, if the Chord ring has 64,000 nodes, any query for resource k takes, on average, 16 hops to reach successor(k). This characteristic is similar to other DHTs such as Chord, Pastry, and Tapestry.

Typical query messages contain the target resource's key and a Time-to-Live (TTL) value. Intermediate nodes forwarding the query messages may decrement the TTL value.

To facilitate proper operation of the Chord ring 100, each node maintains its finger table and, as a node joins or leaves the Chord ring 100, chord finger tables throughout the Chord ring 100 are automatically updated.

In the exemplary system, when a joining node requests to join the network, the joining node may, for example, apply the hash function of the DHT to its IP address to generate an identification value.

In P2P network 100, node 0 (i.e., that has peer 150 connected) may search for resource 14 (i.e., that has peer 170 connected) based on information in its DHT (e.g., routing table entry (8:12) and may send a query to node 12. If node 12 is a malicious node (e.g., intends to disrupt P2P network 100), then node 12 may discard the query or may return an error message to node 0 indicating, for example, that resource 14 does not exist or that another peer 150, 155, 160, 175, 180, 185 or 190 in P2P network 100 is not properly responding to the query which had been forwarded to it. That is, malicious node 12 may sabotage the routing of the query to node 14.

In certain exemplary embodiments of the present invention, the source node (node 0 in this example) may send the same query to search for resource 14 to one or more other nodes in its routing table 196 of the DHT. For example, node 0 may send such a query to node 3, which may forward the query to malicious node 12. In this instance, malicious node 12 may again sabotage the routing of the query. If node 0, however, sends the query to node 6, it may forward the query directly to node 14. Node 14 may then reply to node 0 either with a response to the query or indicating a look-up failure. Because in the last example the route had been selected to exclude the malicious node 12, node 12 was prevented from sabotaging the routing of the query.

One of skill in the art understands that routing to avoid the malicious node is increasingly more difficult as the malicious node is postioned closer to the originating or destination node in the node ID space (e.g., when the malicious node neighbors, is proximate to and/or is less than a certain number of hops away from the originating or destination node) and as the number of malicious nodes increase in number.

Although recursive routing is illustrated, it is contemplated that iterative routing may be used. That is, routing may be performed in an iterative manner such that a plurality of peers (nodes) provide to the origin node information about the next hop. The origin node, for example, node 0 (i.e., the originating node) may contact, for example a predetermined number N of neighboring nodes (e.g., 3, 6 and/or 12) that are deemed closer to the destination node (e.g., the peer managing the resource being queried) than the origin node (or intermediate hop). Each neighbor 3, 6 or 12 may provide the origin node with a list of peers (nodes) that are deemed closer than it to the destination node (for example, node 3 may send to node 0 a reply listing nodes 6 and 12 as being closer to node 14 than itself and which are known to node 3 based on its routing table entries). Based on the set of replies from the nodes deemed to be closer to node 14, node 0 may send another query to other sets of nodes identified by the first set of replies. The process may be repeated until the destination node (e.g., node 14) is reached or until the origin node (e.g., node 0) terminates the query operation.

It is contemplated that origin node 0 may track information about which other nodes 3, 6, 12, 14, 18, 20, 23 and 27 on P2P network 100 have provided successful routing of requests (e.g., lookup requests and placement requests, among others), and may adjust routing to trusted nodes (e.g., nodes providing proper information based on the outcome of the requests).

Malicious nodes may be disruptive in the joining or leaving of other peers to the network 100, because the joining node may update its entire DHT routing table during a joining operation and selected other nodes may update one or more routing table entries of their DHT routing tables during a joining or a leaving operation.

Malicious nodes may also perform a large number of registrations with either randomly or quasi-randomly generated node IDs and IP addresses. It is also possible that a malicious node may target certain node IDs and IP addresses to corner a portion or portions of the node ID space. In the latter case, it is possible that the malicious node may intend to disrupt one or more particular peers (i.e., nodes) on P2P network 100. Alternatively, a malicious node may register a plurality of node IDs which may enable the malicious node to sabotage many points in P2P network 100.

Although certain exemplary embodiments are described, for example, in terms of: (1) methods using certifications which limit the number of node IDs available for a particular user or peer; (2) methods for verifying the node ID of a peer with its locator address (e.g., its IP address) to ensure authenticated peer have one or a limited number of node IDs associated with their locator address; (3) methods of storing and/or retrieving copies of a resource at a plurality of peers based on a plurality of generated resource keys; (4) a P2P network configured to include peers having a first set of node IDs generated by a first common node ID generating function and a second set of node IDs generated by a second common node ID generating function such that a particular peers may communicate to other peers on the P2P network using both the first and second sets of node IDs; and/or (5) a P2P network configured to include a set of peers having a first set of node IDs associated with a first topology (e.g., a Chord topology, a Content Addressable Network (CAN) topology, a Tapestry topology or a Pastry topology, among others) of the P2P network and the set of peers having a second set of node IDs associated with a second topology different from the first topology such that a particular peer may communicate with other peers on the P2P network using both the first and second sets of node IDs, they may also include combinations thereof.

Although certain exemplary embodiments are described in terms of a Chord network, they may be applied to other networks employing DHTs or any overlay network in which one or multiple node identifiers, different from the underling network address, such as IP addresses, are assigned to the nodes of the network and messages are routed based on the node identifiers in the overlay network. For example, they may apply to other P2P networks including CAN networks, Pastry networks, and Tapestry networks, among others. Moreover, the terms successor and predecessor nodes may be generalized in such networks to refer to: (1) nodes that neighbor a particular node (in proximity to the particular node based on the structure of the identification space); (2) nodes that are in the routing table of the particular node or (3) nodes that are known to the particular node.

Figure 2:
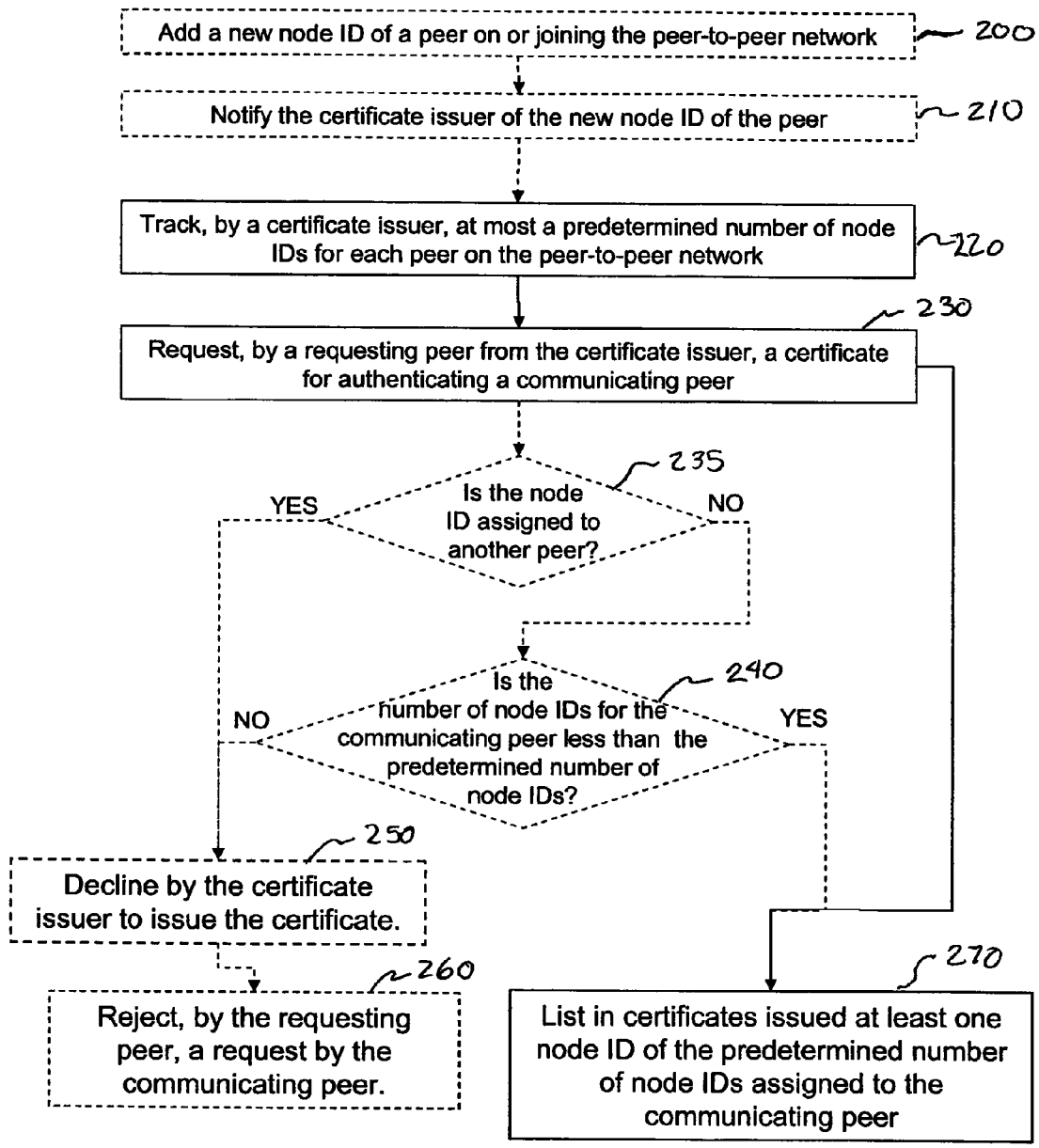
FIG. 2 is a flow chart illustrating a method of authentication between peers of a P2P network in accordance with an exemplary embodiment of the present invention.

FIG. 2 is a flow chart illustrating a method of authentication between peers of a P2P network in accordance with an exemplary embodiment of the present invention.

Now referring to FIG. 2, at optional block 200, a new node ID of a peer on or joining P2P network 100 may be added. That is, a peer already joined to P2P network 100 may add an additional node ID or a node which does not have any node IDs associated with it, may request a node ID as part of the joining operation.

At block 210, a certificate issuer, which may be: (1) a peer on P2P network 100; (2) a dedicated certificate authority; (3) a service provider of certificates; and/or (4) a centralized server, may be notified of the new node ID of the peer on or joining the P2P network 100. That is, the peer requesting the new node ID may notify the certificate issuer that it is claiming the new node ID.

At block 220, the certificate issuer may track at most a predetermined number of nodes IDs for each peer on P2P network 100. That is, the certificate issuer may track, in a database or other list (e.g., an indexed file or a VSAM file, or other types of files, among others), the node IDs that have been assigned to each peer on P2P network 100. By tracking the number of node IDs associated with each particular peer and/or user, one type disruption by malicious nodes can be limited. For example, a malicious node if limited to a preset number of node IDs may not be able to effectively corner or hoard node IDs in a portion of the node space.

At block 230, the requesting peer may request a certificate for authenticating a communicating peer. The certificate may be provided from the certificate issuer or a peer used to store existing certificate issued by the certificate issuer, for example, a storage peer or the communicating peer. In this example, the "requesting peer" refers to a peer on P2P network 100 which is attempting to authenticate the identity of a communicating peer. "Communicating peer" refers to a peer which requests a service of (or other interaction with) the requesting peer.

At optional block 235, the previous assignment of the node ID to another peer on the network is checked. If the node ID for the communicating peer is assigned to another peer, then processing moves to optional block 250.

At optional block 240, if the node ID is not assigned to another peer, the certificate issuer determines whether the number of node IDs for the communicating peer is less than a predetermined number of such node IDs. That is, if the communicating peer has established a set of node IDs which exceeds in number a pre-established threshold, then the certificate issuer determines at block 240 that an excessive number of node IDs have been issued to the communicating peer and, at optional block 250, declines to issue a certificate to the requesting peer.

At optional block 260, if the certificate issuer declines to issue the certificate to the requesting peer, the requesting peer may reject some portion or all requests for service by (or an interaction with) the communicating peer. This prohibition (rejection) of interaction with the communicating peer may be for a preset period of time and may (or may not) be revisable in the preset period based on reception of a proper certificate by the requesting peer.

At block 270, if the number of node IDs for the communicating peer is less than the predetermined number of node IDs or if the operation at optional block is not completed, at least one node ID of the predetermined number of node IDs assigned to the communicating peer may be listed in a certificate and sent to the requesting peer to authenticate the identity of the communicating peer. That is, the communicating peer may be authenticated based on the reception by the requesting peer of the certificate which has listed at least one node ID of the communicating peer.

It is desirable that the certificate issuer list all of the node IDs associated with the communicating peer in the issued certificate. In this way, the requesting peer may determine based on its individual criteria, whether an excessive number of node IDs are associated with the communicating node, even if the certificate issuer does not determine whether an excessive number of node IDs exist for a particular communicating peer.

In certain exemplary embodiments of the present invention, certificates may be requested for verification by peers either randomly or when a particular service or interaction (such as a lookup or placement) is requested.

If the node ID of the communicating peer (e.g., the source node or originating peer) of the service request is not included in the certificate issued by certificate issuer for the communicating peer, the service requests may be rejected by the requesting peer.

In certain exemplary embodiments of the present invention, the certificate may be stored in the network and accessible to any peers. Then, upon receiving a service request from the communicating peer, the requested peer may lookup the certificate of the communicating peer from the network, verifying the node ID of the communicating peer.

In certain exemplary embodiments of the present invention, if there is one or plural central authorities assigning node IDs or controlling the node ID assignment, a record about node ID assignment is generated and stored in the network. Such a record includes the assigned node ID and information about the node to which the node ID is assigned which may include the locator address, such as IP address of the node. The record may be digitally signed by the central authority or any party trusted by peers including the node to which the node ID is assigned.

When requested for a service by a communicating peer, the requested peer may lookup the record and verify the node ID of the communicating peer.

Figure 3:
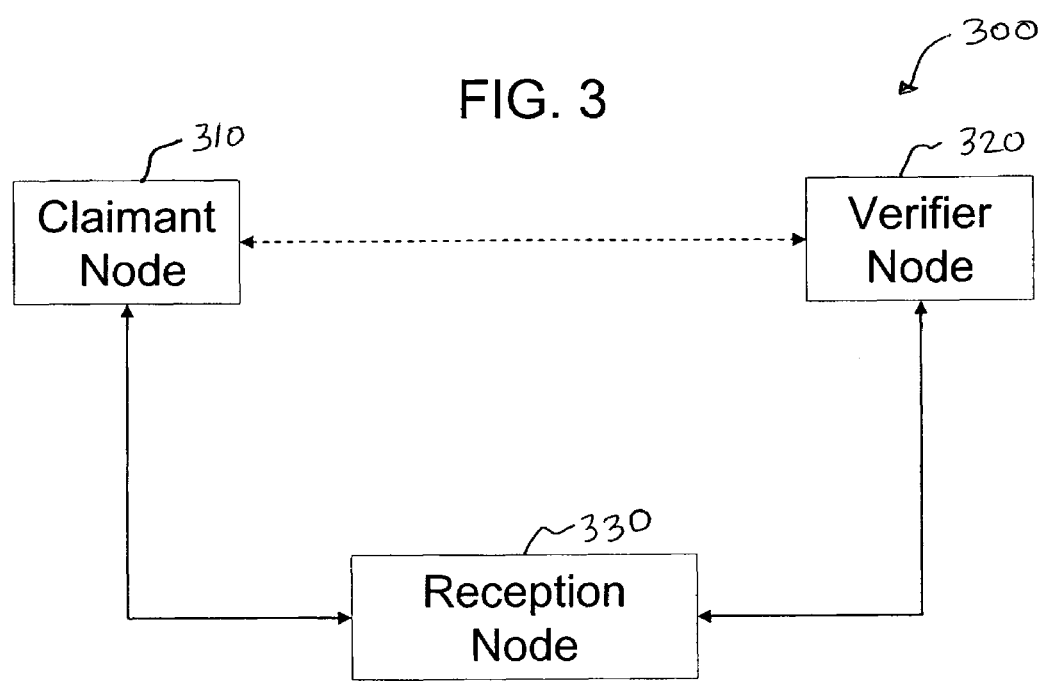
FIG. 3 is a block diagram illustrating claimant, requested and verifier nodes of a P2P network.

FIG. 3 is a block diagram illustrating claimant, reception and verifier nodes of a P2P network.

Now referring to FIG. 3, P2P network 300 may include at least a claimant node 310, a verifier node 320 and a reception node 330. Each of these nodes 310, 320 and 330 may communicate with each other (as depicted by the two way arrows in FIG. 3). Claimant node 310 may refer to a node originating a request or claiming an ownership for a node ID, reception node 330 may refer to a node which is in charge of a set of node IDs containing the node ID being requested by claimant node 310, but otherwise, may be any other node on P2P network 300 other than claimant node 310 and verifier node 320. Verifier node 320 may refer to a node that stores binding placement records of nodes on P2P network 300. That is, claimant node 310 may send a message with a claim for a particular node ID and a particular locator address (for example, a particular IP address, a particular IP address and a port number or any other unique or substantially unique address in another addressing system). Reception node 330 may receive the message including the claim to the node ID and locator address from claimant node 310. Verifier node 320 may verify that a particular locator address is either uniquely associated with a node ID or associated with a limited number of node IDs for P2P network 300.

Although verifier and reception nodes 320 and 330 are illustrated as being separate, it is contemplated that these nodes 320 and 330 may be a single common node. That is, one node may function as both verifier node 320 and reception node 330.

Figure 4:
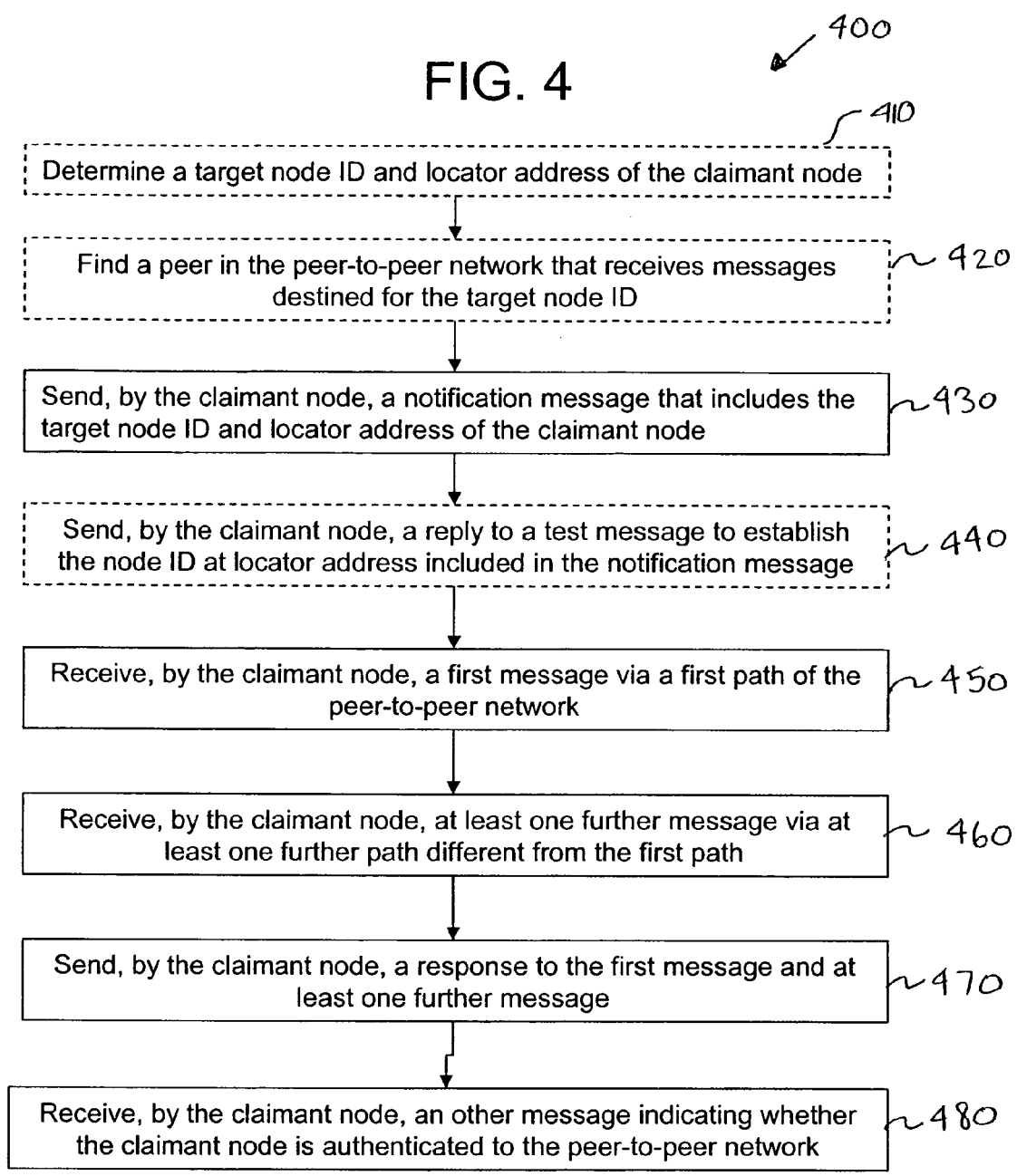
FIGS. 4, 5 and 6 are flow charts illustrating a method of verifying a node ID of the claimant node using the requested and verifier nodes of FIG. 3 in accordance with another exemplary embodiment of the present invention.
Figure 5:
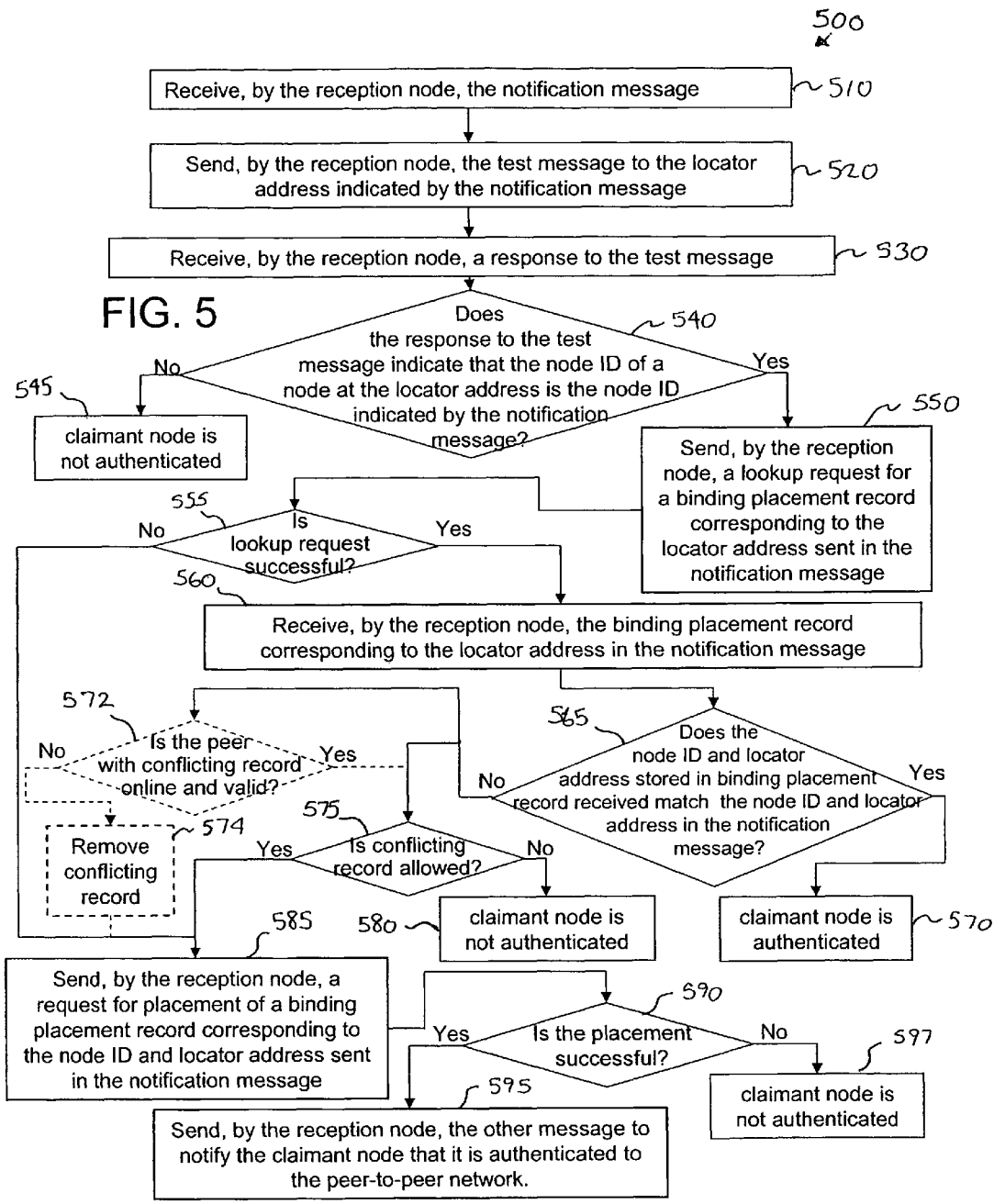
Figure 6:
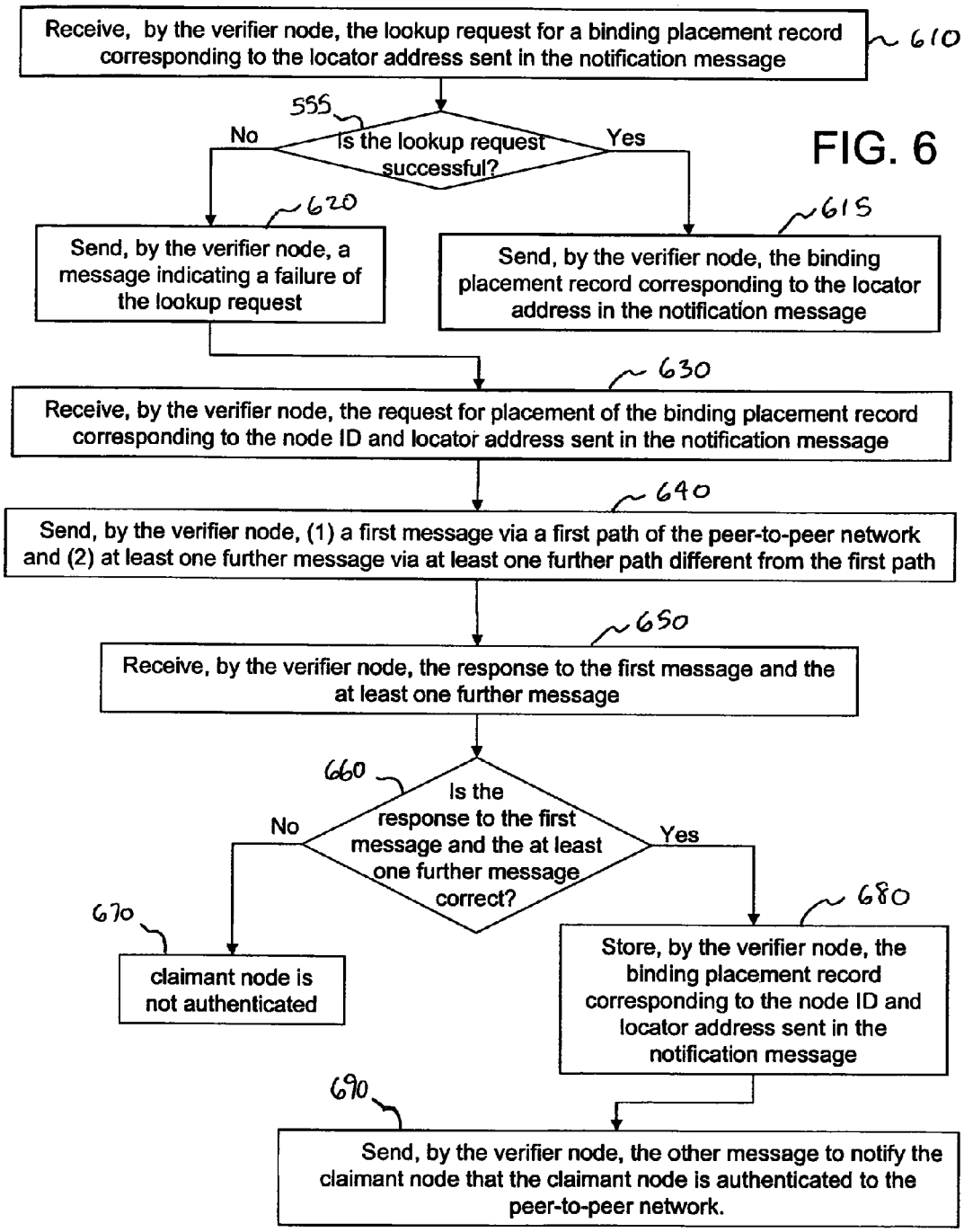

FIGS. 4, 5 and 6 are flow charts illustrating a method of verifying that a node ID of claimant node 310 using the verifier and reception nodes 320 and 330 of FIG. 3 in accordance with another exemplary embodiment of the present invention. More particularly, flow chart 400 of FIG. 4 represents the operation of claimant node 310, flow chart 500 of FIG. 5 represents the operation of reception node 330, and flow chart 600 of FIG. 600 represents the operation of verifier node 320.

Referring now to FIG. 4, at optional block 410 claimant node 310 may determine its target node ID and its locator address. The target node ID may refer to the node ID that is being claimed by claimant node 310. Claimant node 310 may have previously claimed one or more other node IDs.

At optional block 420, reception node 330 (e.g., a peer in P2P network 330) that may receive messages destined for the target node ID, may be found. That is, reception node 330 may be the node responsible for the target node ID in P2P network 300.

At block 430, claimant node 310 may send a notification message that includes the target node ID and locator address of claimant node 310 to reception node 330. That is, a notification message, which may include binding information (e.g., information indicating the target node ID and locator address of claimant node 310) may be sent to reception node 330.

At block 440, claimant node 310 may send a reply to a test message sent by reception node 330, at block 520 of FIG. 5, to establish the node ID and locator address included in the notification message. That is, after reception node 330 sends the test message, claimant node 310 responds with the reply to the test message to verify/establish the node ID and locator address included in the notification message.

At block 450, claimant node 310 may receive from verifier node 320 a first message via a first path of P2P network 330 and at block 460 may further receive from verifier node 320 at least one further message via at least one further path different from the first path. That is, verifier node 320 may send to claimant node 310 a first message and at least one further message. The first and further messages may be derived from a token that is split into a first component part and at least one further component part.

It is contemplated that the first path may be based on, for example, the locator address of claimant node 310 such that the first message may be directed to claimant node 310 via, for example, standard IP addressing (e.g., IP addressing and/or IP and COM port addressing or non-Internet Protocol message routing). It is also contemplated that at least one further path may be based on the node ID of claimant node 310. That is, routing of this further path may be based on DHT routing or any other node ID based routing within P2P network 300.

At block 470, the response to the first message and the at least one further message may be sent by claimant node 310. That is, if the first and further messages are received by claimant node 310 (e.g., claimant node 310 may acquire the component parts of the original token sent by verifier node 320), the claimant node 310 may reconstruct the token from its component parts and may send a response which either includes the reconstructed token or, some value derived from the reconstructed token. By receiving the first message and further messages, the target node ID that was sent in the notification message is checked against the locator address also sent in notification message. Thus, the response to the first and further messages may verify that the node ID of claimant node 310 corresponds to (binds with) the locator address of claimant node 310.

The token is illustrated to be split into at least two components parts by verifier node 320 and sent to claimant node 310. It is contemplated, however, that two or more independent messages may be sent from verifier node 320 to claimant node 310 via respective individual routes based on the node ID and locator address.

It may also be desirable to select routing paths which either do not overlap or substantially do not overlap routes to reduce or eliminate, for example, man-in-the-middle type attacks from malicious nodes.

It is further contemplated that these individual messages: (1) may be individually sent back to verifier node 320 from claimant node 310 to validate the routing reliability test; (2) may be challenge strings (e.g., quasi-random or random bit strings) and may be combined (either by concatenation of the challenge strings, by scrambling of them or by a derivation using the challenge strings with a predetermined mathematical function (e.g., a hash function or an encryption code) on a portion or all or the combined message and the combined message may be sent back to verifier node 320 from claimant node 310; or (3) one of the individual messages may be a challenge string and another message may be a mathematical function to be performed on the challenge string such that a derived message (i.e., derived from the challenge string and mathematical function received from verifier node 320) may be sent back to verifier node 320.

At block 480, a confirmation message may be received by claimant node 310 from either verifier 320 or reception node 330 to indicate whether claimant node 310 is authenticated to P2P network 300. That is, if verifier node 320 determines that the response sent by claimant node 310 at block 470 is correct, a message indicating that claimant node is authenticated is sent by verifier node 320 to claimant node 310.

After being authenticated, claimant node periodically sends a message refreshing the binding to verifier node.

Now referring to FIG. 5, at block 510, reception node 330 may receive the notification message sent by claimant node at block 430 (shown in FIG. 4). At block 520, reception node 330 may send the test message to the locator address indicated by the notification message. The test message is received by claimant node 310 at block 440 (shown in FIG. 4). The test message may be sent to the locator address indicated in the notification message and may request the node ID of the peer receiving the message at the locator address. After receiving the response to the test message at block 530, the reception node 330 at block 540 may determine whether the response to the test message indicates that the node ID of the node at the locator address is a node ID indicated in the notification message.

At block 545, if a response to the test message does not indicate that the node ID of a node at the locator address is the node ID indicated in the notification message, claimant node 310 may not be authenticated.

At block 550, if the node ID of the node at the locator address is the same as that in the notification message, then reception node 330 may request a lookup for a binding placement record corresponding to the locator address sent in the notification message on the P2P network. That is, if reception node 330 confirms from the test message that the node ID at the locator address and the node ID in the notification message match, then it may request of verifier node 310 to lookup the binding placement record corresponding to the locator address sent in the notification message. Locator address refers to a unique address, for example, an IP address or a combination for an IP address and a port number, corresponds to a particular node ID of a particular peer on or joining P2P network 300.

At block 555, the verifier node determines whether the lookup request for the binding placement record at block 550 is successful. That is, whether verifier node 320 found a binding placement record corresponding to the locator address in the notification message. If the lookup request is successful, at block 560, reception node 330 may receive from verifier node 320 the binding placement record corresponding to the locator address in the notification message. That is, the binding placement record which had been previously stored in verifier node 320 may be sent from verifier node 320 to reception node 330.

In the binding placement record received from verifier node 320, the node ID associated with the locator address in the notification message may or may not match the node ID in the notification message. At block 565, reception node 330 determines whether the node ID of the locator address stored in the received binding placement record matches the node ID of the locator address in the notification message.

At block 570, if the node ID and locator address stored in the received binding placement record matches the node ID and locator address in the notification message, claimant node 310 is authenticated. At block 572, if the node ID corresponding to the locator address indicated in the binding placement record does not match the node ID in the notification message, reception node may test if the node of the locator address indicated in the binding placement record is still online and the record is valid. The test procedure may consist of sending: (1) a test message destined to the locator address indicated in the binding placement record and waiting for a reply; or (2) two messages over different paths. One of these two messages (destined to the node ID indicated in the binding placement record) is routed over the P2P network and the second one of the messages (destined to the locator address indicated in the binding placement record) is routed in the physical network such as by IP routing. If the binding placement record is not valid, the reception node sends a message indicating that determination to the verifier node 320. Then, the verifier node 320 may test the validity of the binding placement record using the same procedure it used to test for the binding initially. At block 574, if binding placement record is confirmed not to be valid, the verifier node 320 removes the binding placement record and sends a message indicating the removal to the reception node 330. In this instance, the reception node 330 may behave as if no conflicting binding placement record exists and the process may proceed to block 585.

At block 575, if the validity of the binding placement record is confirmed through a test or assumed without the test, then it is determined whether conflicting records (e.g., records having a common locator address but different node IDs) are allowed according to predetermined rules. For example, conflicting records may not be allowed under any conditions or conflicting records may be allowed under certain conditions, for example, that at most a predetermined (e.g., limited number of different) node IDs may be associated with a particular locator address. If the particular conflicting record or records are allowed, the process may proceed to block 585. If the particular conflicting record or records are not allowed according to the predetermined rules, at block 580 claimant node 310 may not be authenticated. The predetermined rules may be set up by a user to limit the effect of any one node on P2P network 300 such that the effect of a malicious node is reduced.

At block 585, if the lookup request is not successful at block 555, if the conflicting record is removed at block 574 or if conflicting record or records are allowed at block 575, reception node 330 may send a request for placement of a binding placement record corresponding to the node ID and locator address sent in the notification message. That is, if verifier node 320 cannot find a binding placement record with a locator address or a locator address and node ID that corresponds to those in the notification message, reception node 330 may request placement of such a binding placement record for storage in verifier node 320.

At block 590, verifier node 320 may determine whether the placement of the binding record, at block 580, is successful. At block 595, if the placement is successful, reception node 330 may send the confirmation message (described at block 480 of FIG. 4) to notify claimant node 310 that it is authenticated to P2P network 300. That is, reception node 330 may receive from verifier node 320, the confirmation message indicating that claimant 310 is authenticated to P2P network 300. At block 597, if the placement request is not successful, then claimant node 310 is not authenticated.

Now referring to FIG. 6, at block 610, verifier node 320 may receive the lookup request for the binding placement record corresponding to the locator address in the notification message. That is, verifier node 320 may receive from reception node 330 or lookup request which is sent at block 545 (as shown in FIG. 5). After the lookup request for the binding placement record is received at block 610, verifier node 320 may search for the binding placement record corresponding to the locator address in the notification message. At block 615, if the lookup request is successful at block 555, verifier node 320 may send the binding placement record, corresponding to the locator address in the notification message, to reception node 330. This corresponds to the operation at block 560 (shown in FIG. 5).

At block 620, if the lookup request is not successful, verifier node 320 may send a message to reception node 330 indicating a failure of the lookup request. At block 630, verifier node 320 receives from reception node 330, the request for placement of the binding placement record that corresponds to the node ID and locator address sent in the notification message. This operation corresponds to block 585.

At block 640, verifier node 320 sends the first message via the first path of P2P network 300 and the further message(s) via at least one further peer path. The first and further messages may be sent to claimant node 310 and may correspond to the first and further messages at blocks 450 and 460 (as shown in FIG. 4). At block 650, verifier node 320 may receive from claimant node 310 the response to the first and further messages sent at block 470 of FIG. 4. At block 660, verifier node 320 may determine whether the response to the first and further messages is correct.

At block 670, if the response to the first and further messages is not correct, claimant node 310 is not authenticated. If the response to the first and further messages, however, is correct, at block 680, verifier node 320 may store the binding placement record corresponding to the node ID and the locator address in the notification message. That is, if the claimant node 310 correctly responds to the first and further messages, the node ID and locator address in notification message are verified to correspond with each other such that verifier node 320 may store the binding placement record which indicates this correspondence between the node ID and locator address of claimant node 310.

At block 690, verifier node 320 may send via reception node 330 to claimant node 310, the confirmation message (described in block 480 of FIG. 4) to notify claimant node 310 that it is authenticated to P2P network 300.

Although three nodes, claimant nodes 310, verifier node 320, and reception node 330 are shown, it is contemplated that two or more nodes may be used. That is, functions of verifier node 320 may be incorporated into reception node 320 or other nodes may perform one or more functions of verifier node 320 or reception node 330, for example.

When a new binding placement record is created, the verifier node may receive messages refreshing the binding from claimant node. In this embodiment, if such refresh messages are not received or are received after a predetermined period has elapsed, the binding placement record expires and is removed by the verifier node.

Figure 7:
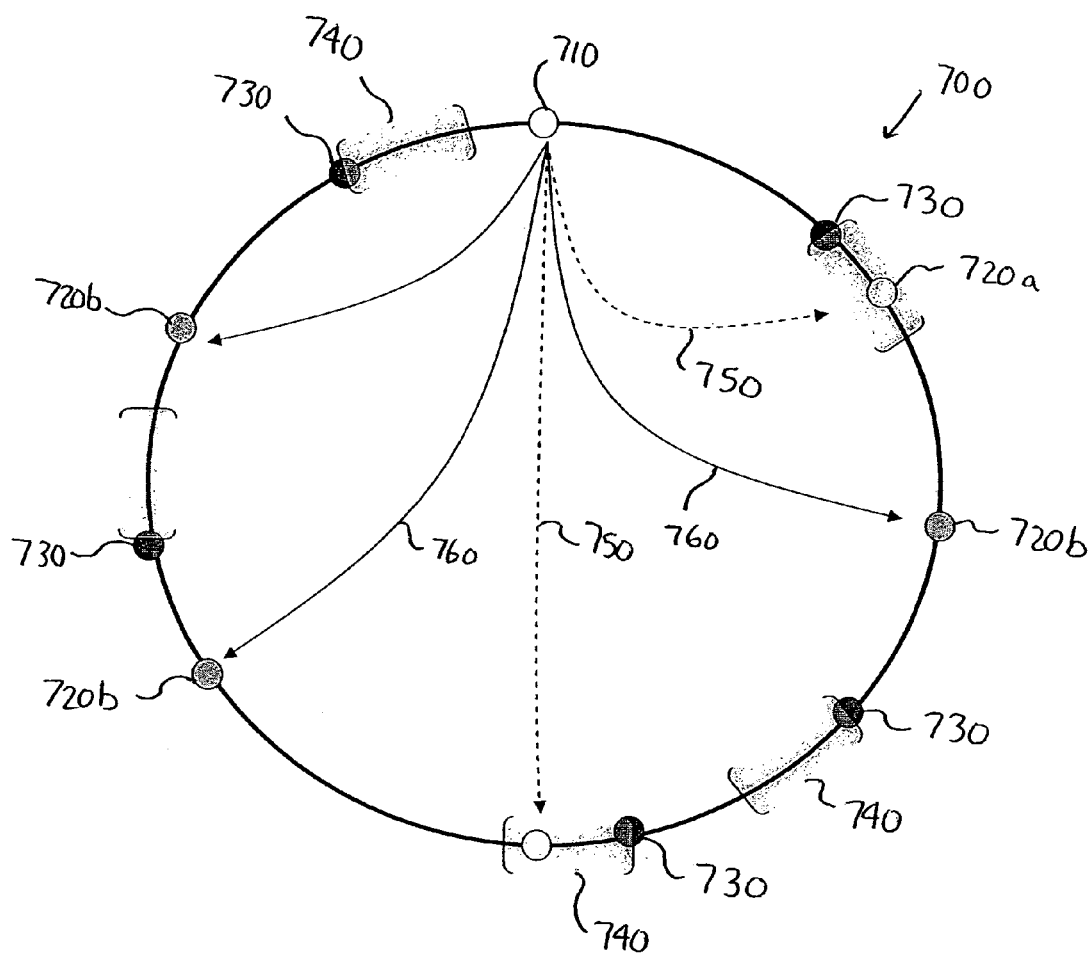
FIG. 7 is a schematic diagram illustrating a P2P network in which resources are stored using a plurality of resource keys in accordance with yet another exemplary embodiment of the present invention.

FIG. 7 is a schematic diagram illustrating a P2P network in which resources are replicated using a plurality of resource keys in accordance with yet another exemplary embodiment of the present invention Now referring to FIG. 7, P2P network 700 may include a plurality of nodes, for example, a origin node 710, resource storage nodes 720a and 720b and malicious nodes 730. For example, origin node 710 may request a lookup of a resource stored in resource storage nodes 720a and 720b. Moreover, malicious nodes 730 may be located proximate to or neighboring some or all of the resource storage nodes (as illustrated by shaded regions 740 of the P2P network 700). For example, origin node 710 may send a lookup request (denoted by dotted arrow 750) to one of the resource storage nodes 720a. A copy of the requested resource may have been previously stored in each of the resource storage nodes 720a and 720b based on a selected storage algorithm. Because each of the resource storage nodes 720a is located in a region affected by a malicious node 730, however, the lookup request may be sabotaged (e.g., dropped or misdirected by the malicious node 730). Thus, the lookup request sent by origin node 710 may not be received by the resource storage node 720a. In such a case, the resource may be copied and stored in resource storage nodes 720b which are outside of the affected shaded regions 740.

The probability that malicious node 730 can affect routing to resource storage node 720b is relatively smaller than that of resource storage node 720a. This is because, malicious nodes may affect routing locally (proximate to themselves) much more (e.g., a larger number of requests may be routed through them locally) than they affect routing to a remote portion or portions of P2P network 700. The selection of resource storage nodes 720a for storage of a particular resource may be deterministically selected or randomly selected. As the number of stored copies of a particular resource increases, the probability that one or more of these stored copies is located outside of the shaded regions 740 affected by malicious nodes 730 also increases. Thus, origin node 710 may send a lookup request 750 and 760 (denoted by the solid arrows) to at least one of the resource storage nodes 720a or 720b to request a copy of the resource. Although origin node 710 may know which resource storage nodes 720a and 720b are affected by malicious nodes, resource storage nodes 720b have a relatively high probability (higher than resource storage nodes 720a) of reception of lookup requests 760.

Figure 8:
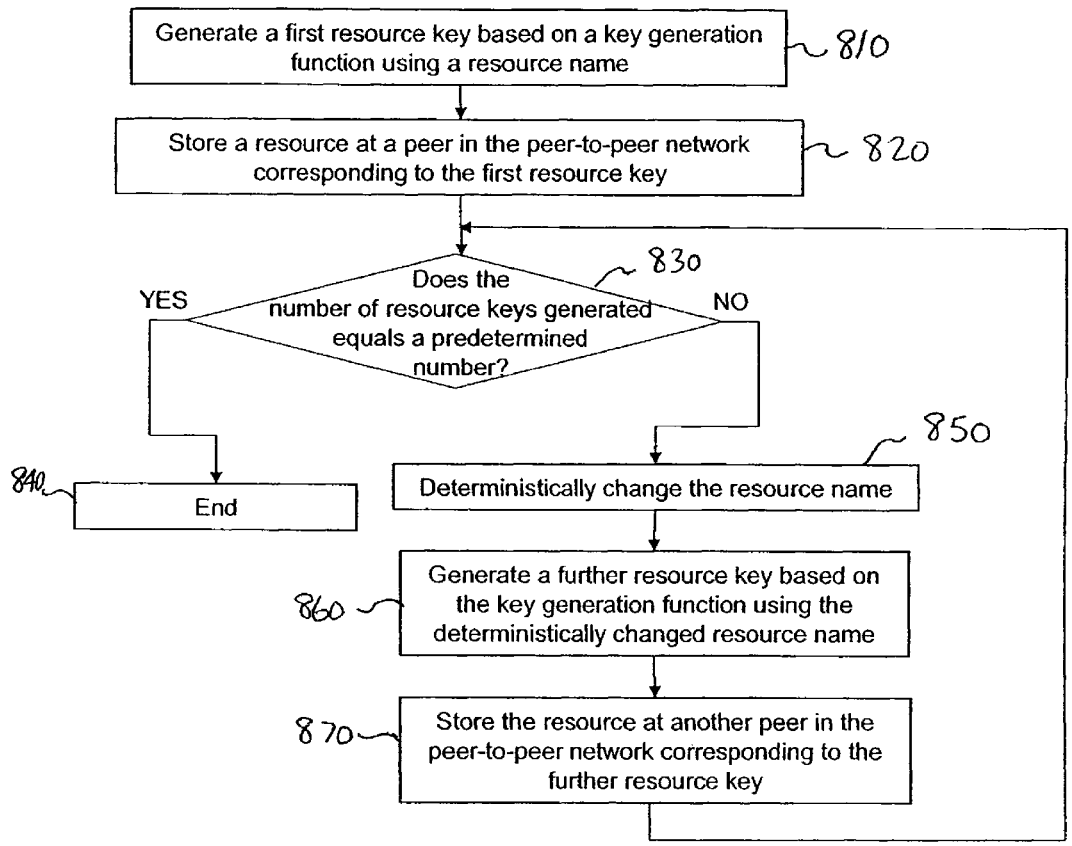
FIG. 8 is a flow chart illustrating a method of storing copies of resources on peers in the P2P network of FIG. 7 in accordance with yet another exemplary embodiment of the present invention.

FIG. 8 is a flow chart illustrating a method 800 of storing copies of resources on peers in the P2P network of FIG. 7 in accordance with yet another exemplary embodiment of the present invention.

Now referring to FIG. 8, at block 810, a first resource key may be generated based on a first key generation function using, for example, a resource name of the resource to be stored. That is, if a file is to be stored in P2P network 700, for example, the file name of the resource may be used by the key generation function, for example: (1) Secure Hash Algorithm-1 (SHA-1); (2) Data Encryption Standard (DES); (3) Message-Digest Algorithm 5 (MD5); or (4) Triple (DES), among many others). The hash function may be a one-way hash function and may generate the first resource key.

The first resource key may enable storage of a copy of the resource at a node corresponding to the resource key (e.g., the node managing the resource key). At block 820, the copy of the resource may be stored at the node corresponding to the resource key, for example, by replicating the resource and sending the replicated resource (e.g., the copy of the resource to the node responsible for managing the resource key.

At block 830, it is determined whether the number of resources keys generated equals a predetermined number. If the number of resource keys equals the predetermined number the process may end at block 840. At block 850, if the number of resource keys generated does not equal the predetermined number, the resource name may be deterministically changed. That is, for example, the resource name may be scrambled, rotated and/or mathematically manipulated. Alternatively, it is contemplated that the resource name may be concatenated with a predetermined or randomly selected bit string such that the resource name and bit string are deterministically changed, for example, by rotation, scrambling and/or mathematically manipulation of either a resource name and bit string or the bit string alone.

After either the resource name or the resource name and bit string are deterministically changed, at block 860, a further resource key may be generated based on the same key generation function used to generate the first resource key using the deterministically change resource name. That is, using a common key generation function, a further resource key may be generated by deterministically changing the resource name.

At block 870, a copy of the resource is stored at another peer in the P2P network 700 corresponding to the further resource key.

After block 870, the process returns to block 830. That is, the process continues to generate further resource key and stores copies of the resource at nodes corresponding to these resource key until a predetermined number of resource key have been generated, at which time the process ends at block 840.

Although sequential lookup requests are illustrated, it is contemplated that multiple lookup requests may be sent in parallel, each of the lookup requests may, for example, use a different variation of the resource name. The variations of the resource name may be deterministic variations.

Figure 9:
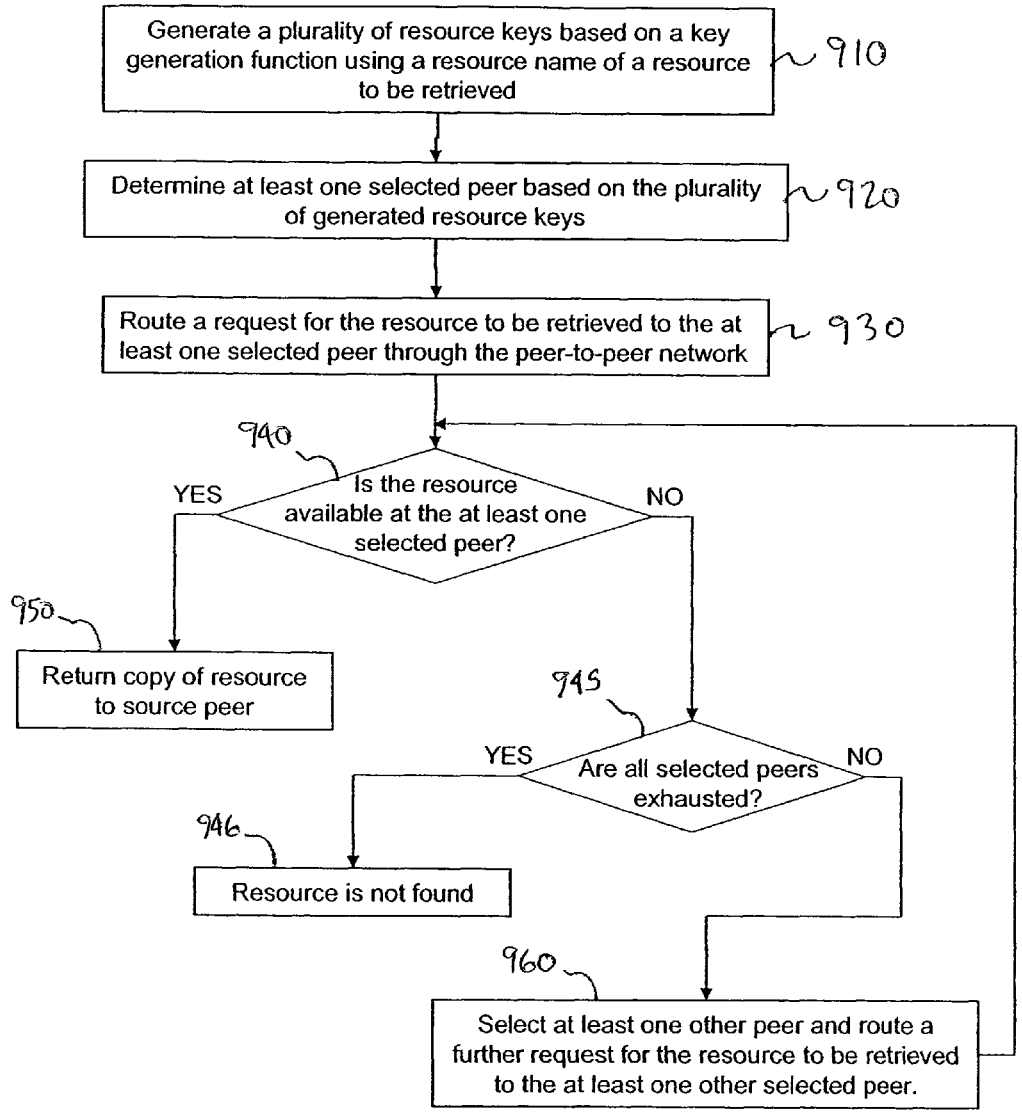
FIG. 9 is a flow chart illustrating a method of retrieving a copy of a resource from a peer in the P2P network of FIG. 7 in accordance with yet another exemplary embodiment of the present invention.

FIG. 9 is a flow chart illustrating a method of retrieving a copy of a resource from a peer in the P2P network of FIG. 7 in accordance with yet another exemplary embodiment of the present invention.

Now referring to FIG. 9, at block 910, the plurality of resource keys are generated based on a common key generation function using a resource name of the resource to be retrieved. That is, resource keys may be generated for retrieval of resources. These resource keys match the resource key generated for use in storing copies of the resource and use a common key generation function for both storage and retrieval of copies of resources. At block 920, at least one selected peer is determined based on the plurality of generated resource keys. That is, at least one peer which has the resource stored in it is determined such that a lookup request may be sent to the selected peer. The determination of the at least one selected peer may be based on: (1) a routing distance (i.e. the number of hops from the originating peer to the selected peer; (2) known malicious peers; (3) location of any trusted peers (peers which have recently been involved in successful lookup requests); and/or (4) a random or quasi-random selection. By using different selection techniques, for example randomly, it becomes difficult for a malicious peer to block routing of a lookup request for the resource.

At block 930, the originating (source) peer may send a lookup request to search for a copy of the resource to be retrieved to at least one selected peer through P2P network 700.

At block 940, the availability of the resource at the selected peer may be determined based on, for example, success or failure of the lookup request. At block 950, if the resource is available at the selected peer, a copy of the resource may be returned to the originating peer. At block 960, if the resource is not available at the selected peer, at least one other peer may be selected and a further request may be routed to the other peer for retrieval of a copy of the resource. That is, for example, if a first selected peer is not available or the resource is not available at the first selected peer, a further peer may be selected for retrieval of a copy of the resource. Moreover, any number of further peers may be selected until a copy of the resource is returned to the source peer or the source peer terminates the lookup request for example, based on the number of retries to find a copy of the resource.

At block 945, if all the selected peers have been exhausted, a message is returned to the originating peer indicating that the resource has not been found and the process ends at block 946. If not, the process continues at block 960.

It is also contemplated that a termination of the lookup request may be based on the time-to-live for such a request or a predetermined number of selected peers being contacted.

After block 960, the process returns to block 940 to determine if the resource is available at the selected further peer. That is, further peers may be repeatedly selected until the resource is determined to be available at a particular further peer. At which point, the resource may be returned to the source peer.

Although a process is shown for which further peers are selected and the availability of copies of the resource stored at these further peers is repeatedly determined in blocks 940 and 960, it is contemplated that termination of this loop may include for example, determining a maximum number of further selected peers or determining a time-to-live for a lookup request, as an example.

Figure 10:
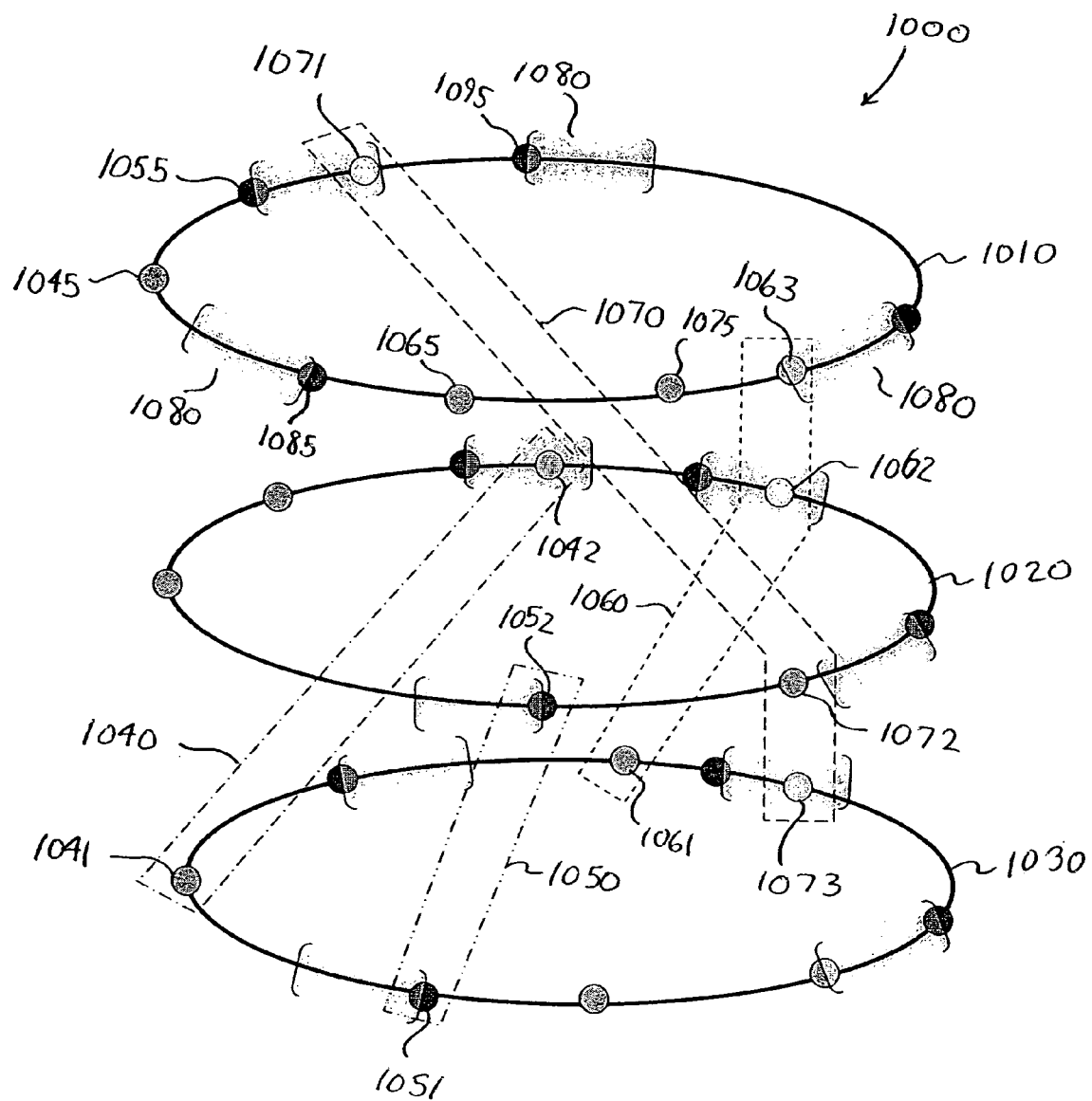
FIG. 10 is a schematic diagram illustrating a P2P network in accordance with yet another exemplary embodiment of the present invention.

FIG. 10 is a schematic diagram illustrating a P2P network in accordance with yet another exemplary embodiment of the present invention.

Now referring to FIG. 10, an exemplary P2P network 1000 according to yet another embodiment of the invention may include a plurality of chord overlays 1010, 1020 and 1030. Each of the chord overlays 1010, 1020 and 1030 may have a different node ID generating function such that each chord overlay 1010, 1020 and 1030 may have a different node ID space. Each of the chord overlays 1010, 1020 and 1030 may include one or more peers, for example, peers 1040, 1050, 1060, 1070 (denoted by the enclosed dotted regions).

Chord overlay 1010 may include, for example: (1) peer 1070 with node 1071; (2) peer 1060 with node 1063; (3) peer/node 1045; (4) peer/node 1055; (5) peer/node 1075; (6) peer/node 1085; and (7) peer/node 1085. Chord overlay 1020 may include, for example: (1) peer 1040 with node 1042; (2) peer 1050 with node 1052; (3) peer 1060 with node 1062; and (4) peer 1070 with node 1072. Chord overlay 1030 may include, for example: (1) peer 1040 with node 1041; (2) peer 1050 with node 1051; (3) peer 1060 with node 1061; and (4) peer 1070 with node 1073. That is, each peer may have a different node associated with each overlay 1010, 1020 and 1030. For example, peer 1070 is joined to overlays 1010, 1020 and 1030 and includes nodes 1071, 1072 and 1073, respectively.

Although peers 1040, 1050, 1060 and 1070 are shown such that each is joined to multiple overlays of P2P network 1000, other peers (for example, peer 1045, 1055, 1065, 1075, 1085 and 1095) may be joined to a single overlay (in this example, overlay 1010).

Overlays 1010, 1020 and 1030 may be formed using different node ID generating function such that node IDs may be mapped to the node ID space for each overlay differently. For example, the locator address for each peer may be changed (rotated, scrambled or, otherwise, deterministically changed) and a common function, such as a hash function, for example, SHA-1, DES, 3DES, or MD5 may be used to hash the changed locator address. In such an instance, a first node ID may be generated, for example, by applying the common function and may be mapped to overlay 1010, a second node ID may be generated, for example, by rotating the locator address and applying the common function and may be map to overlay 1020 and a third node ID may be generated, for example, by rotating the locator address a second time and applying the common function and may be map to overlay 1030.

Although the described embodiment deterministically changes the locator address and apply a common function, it is contemplated that different functions such as SHA-1, DES, 3DES, or MD5 may be used for different overlays 1010, 1020 and 1030 by applying these different functions to common locator addresses.

Malicious nodes, for example, nodes 1045, 1051, 1052, 1055, 1075, 1085 and 1095 may be located proximate to or neighboring some or all of the nodes in P2P network 1000 (as illustrated by shaded affected regions 1080 of P2P network 1000).

Because certain nodes are located in a region affected by malicious node, the probability that malicious node 730 can affect routing to these nodes is relatively larger than to node outside of the affected regions 1080. In this example, nodes 1063 and 1071 of overlay 1010, nodes 1042 and 1062 of overlay 1020 and node 1073 of overlay 1030 are located in affected regions 1080.

Individual peers may join some or all of the plurality of overlays 1010, 1020 and 1030. Communication between or among peers may occur based on routing in any of the overlays 1010, 1020 and 1030. Because the location (with respect to the node ID space) of each peer in overlay 1010, 1020 and 1030 may be different, routing between or among peers in each overlay also may be different. Affected nodes in one overlay, may not be affected in a second overlay such that communication with (e.g., routing to) this node may be accomplished in the overlay in which the peer does not neighbor a malicious node. The reliability of communication may be increased by providing multiple overlays in the P2P network 1000.

Although three overlays are illustrated, it is contemplated that any number of overlays may be used for communication between peers.

Although Chord overlays are illustrated for each of the overlays in P2P 1000, it is contemplated that each overlay may have a different topology, for example, a Chord topology, a CAN topology, a Pastry topology and/or a Tapestry topology.

In exemplary embodiments, the P2P network may have multiple node ID generating functions, for example, peers may have first node IDs generated by a first node ID generating function and second node IDs generated by a second node ID generating function. such that the first peer may communicate to other peers on the network using both the first and second node IDs.

Although multiple topology networks and multiple node ID generating functions are described separately, one of skill in the art understands that they may be combined.

According to certain embodiments of the present invention, a P2P network is provided to improve reliability of communications even when malicious nodes are attempting to disrupt the network. This is accomplished, in various embodiments by, for example: (1) preventing a peer from joining the network without checking that the node ID and locator address of the peer correspond; (2) tracking the number of node IDs of each peer in the network via a certificate issuer, to limit services (communications) to/from peers having an excessive number of node ID associated with them; (3) storing multiple copies of a resource throughout the network based on, for example, a deterministically change resource name; and (4) providing networks having multiple topologies and/or multiple node ID generating functions. Although these embodiments have been shown separately, it is contemplated that various embodiments may be combined.

Although the system has been illustrated in terms of a P2P network, it is contemplated that certain embodiments of the present invention may be applied in other networks where malicious devices are found.

Although the invention has been described in terms of a P2P network, it is contemplated that it may be implemented in software on microprocessors/general purpose computers (not shown). In various embodiments, one or more of the functions of the various components may be implemented in software that controls a general purpose computer. This software may be embodied in a computer readable carrier, for example, a magnetic or optical disk, a memory-card or an audio frequency, radio-frequency, or optical carrier wave.

In addition, although the invention is illustrated and described herein with reference to specific embodiments, the invention is not intended to be limited to the details shown. Rather, various modifications may be made within the scope and range of equivalents of the claims and without departing from the invention.

What is claimed is:

1. A method of authentication of peers of a peer-to-peer network; comprising the steps of:
   a) tracking, by a processor of a certificate issuer node, at most a predetermined number of node IDs for each peer on the peer-to-peer network wherein at least one of the peers in the peer-to-peer network is identified to the certificate issuer node by at least two node IDs;
   b) requesting, by a requesting peer, a certificate for authenticating a communicating peer; and
   c) listing in each certificate issued by the processor of the certificate issuer node, at least one node ID of the at most predetermined number of node IDs assigned for the communicating peer.

2. The method of claim 1, further comprising the steps of:
   d) adding a new node ID of a peer that is on the peer-to-peer network or that is joining the peer-to-peer network; and
   e) notifying a certificate issuer of the new node ID of the peer, wherein step (a) of tracking the at most predetermined number of node IDs for each peer on the peer-to-peer network includes adding tracking information of the peer to reflect the new node ID.

3. The method of claim 1, further comprising after step (b) the step of:
   if the number of node IDs for the communicating peer is less than the predetermined number of node IDs, issuing, by a certificate issuer, the certificate that lists the node IDs assigned to the communicating peer.

4. The method of claim 1, further comprising after step (b) the step of:
   if the number of node IDs for the communicating peer equals the predetermined number of node IDs, declining by a certificate issuer to issue the certificate.

5. The method of claim 4, further comprising the step of:
   if the certificate is not issued by the certificate issuer, rejecting, by the requesting peer, a request from the communicating peer.

6. The method of claim 1, further comprising the step of:
   if the number of node IDs for the communicating peer equals the predetermined number of node IDs, rejecting, by the requesting peer, a request from the communicating peer.

7. The method of claim 1, wherein step (b) of requesting the certificate for authenticating the communicating peer includes one of: (1) requesting the certificate from a certificate issuer; (2) requesting the certificate from a storage peer, different from the certificate issuer, that stores the certificate in the peer-to-peer network; or (3) requesting the certificate from the communicating peer.

8. A method of verifying that a node ID of a claimant node corresponds to a locator address of an originating peer node in a peer-to-peer network using a verifier node; comprising the steps of:
   a) sending a notification message from a claimant node that includes the node ID and locator address of the claimant node;
   b) receiving, by the claimant node, a first message via a first path of the peer-to-peer network;
   c) receiving, by the claimant node, at least one further message via at least one further path different from the first path;
   d) sending, by the claimant node, a response to the first message and the at least one further message;
   e) receiving, by the claimant node, an other message indicating whether the claimant node is authenticated to the peer-to-peer network.

9. The method of claim 8, wherein the first message is sent using the node ID of the claimant node and the at least one further message is sent using the locator address of the claimant node.

10. The method of claim 8, further comprising the steps of:
    sending, by the verifier node, the first message and the at least one further message including:
      generating a random or quasi-random bit string, as a token;
      splitting the token into a first component part and at least one other component part;
      providing the first message and the at least one further message based of the first component part and the at least one other component part of the split token; wherein step (d) of sending the response includes joining the received component parts of the split token to reconstruct the token; and
    transmitting the reconstructed token.

11. The method of claim 8, further comprising the steps of:
   determining, by the verifier node, if the response to the first message and to the at least one further message is correct;
   if the response to the first message and to the at least one further message is correct, storing the node ID and locator address sent in step (a) in the verifier node, as a binding placement record, for use by other nodes of the peer-to-peer network; and
   sending the other message to notify the claimant node that the claimant node is authenticated to the peer-to-peer network.

12. The method of claim 11, further comprising the steps of:
   setting a time-to-live for each binding placement record; and
   discarding each binding placement record after the set time-to-live has been exceeded.

13. The method of claim 12, further comprising the steps of:
   establishing a refresh period;
   communicating, by the claimant node to the verifier node, during the refresh period a refresh message; and
   resetting the time-to-live for a binding placement record corresponding to the claimant node.

14. The method of claim 11, further comprising the steps of:
   establishing a threshold number of binding placement records having a common locator address for storage in the verifier node; and
   discarding any new binding placement record request when the stored number of binding placement records is at or exceeds the threshold number.

15. The method of claim 8, further comprising the steps of:
   receiving, by a reception node, the notification message,
   sending, by the reception node, a test message to the locator address indicated by the notification message,
   receiving, by the reception node, a response to the test message;
   determining if the response to the test message indicates that the node ID of a node at the locator address is the node ID indicated by the notification message,
   if the node ID of the node at the locator address is the node ID indicated by the notification message, sending, by the reception node, a lookup request for a binding placement record corresponding to the locator address sent in the notification message,
   if the lookup request fails, requesting placement of the binding placement record corresponding to the node ID and locator address sent in the notification message.

16. A system for verifying that node IDs correspond to locator addresses of nodes in a peer-to-peer network, comprising:
   a claimant node which is configured to send a notification message that includes the node ID and locator address of the claimant node;
   a verifier node which is configured to receive the node ID and locator address of the claimant node via the notification message, as a request for a binding placement record, to send a first message via a first path of the peer-to-peer network and to send at least one further message via at least one further path different from the first path, wherein
   the claimant node is configured to send a response to the first message and the at least one further message; and
   the verifier node is configured to determine if the response to the first message and the at least one further message is correct and if the response to the first message and the at least one further message is correct, the verifier node is configured to store the node ID and locator address sent by the claimant node in the verifier node, as a binding check, for use by other nodes of the peer-to-peer network.

17. The system of claim 16, further comprising:
   a reception node which is configured to receive the notification message, to send a test message to the locator address indicated by the notification message, and to receive a response to the test message such that if the response to the test message indicates the node ID of a node at the locator address is the node ID indicated by the notification message, the reception node is configured to send a lookup request to verify a binding placement record corresponding to the node ID and locator address sent in the notification message.

18. The system of claim 16, further comprising:
   a reception node to receive the notification message from the claimant node and to provide to the verifier node the node ID and locator address of the claimant node.

19. A method for retrieving resources from peers in a peer-to-peer network, each peer managing resources with resource keys in a respective range of a key space, each resource being stored at a plurality of peers using a corresponding plurality of different resource keys, the method comprising the steps of:
   a) generating, by a processor associated with a node in the peer-to-peer network, a plurality of respectively different resource keys based on a key generation function using a resource name of a resource to be retrieved;
   b) determining, by the processor associated with the node, at least one selected peer based on the plurality of generated resource keys, including:
      establishing from the plurality of generated resource keys a selected set of peers responsible for managing the resource to be retrieved; and
      determining which one or ones of the selected set of peers are fewer than a predetermined number of hops away from the peer routing the request for the resource, wherein the at least one selected peer is one or more peers of the selected set of peers that are fewer than the predetermined number of hops away from the peer routing the request for the resource;
   c) routing a request for the resource to be retrieved to the at least one selected peer through the peer-to-peer network;
   d) determining an availability of the resource at the at least one selected peer; and
   e) if the resource to be retrieved is not available at the at least one selected peer; selecting, by the processor associated with the node, at least one other peer and routing a further request for the resource to be retrieved to the at least one other selected peer.

20. A peer-to-peer network with a plurality of peers, comprising:
   a first peer node having a first node ID generated by a first node ID generating function and a second node ID generated by a second node ID generating function; and
   a second peer node having a third node ID generated by the first node ID generating function and a fourth node ID generated by the second node ID generating function such that the first peer communicates with the second peer on the peer-to-peer network using both the first and second node IDs.

21. The peer-to-peer network of claim 20, further comprising:
one or more further peer nodes each having first and second further node IDs generated by the first and second node ID generating functions, respectively, each of the first peer node, second peer node and one or more further peer nodes being configured to communicate with any other peer node on the peer-to-peer network via the node IDs generated by the first node ID generating function and/or the second node ID generating function.

22. The peer-to-peer network of claim 20, wherein:
the first peer node has one or more further node IDs generated by one or more further node ID generating functions; and
the second peer node has one or more other node IDs generated by the one or more further node ID generating functions such that the first peer communicates with the second peer node on the peer-to-peer network using any two of the first node ID, the second node ID or the one or more further node IDs.

23. The peer-to-peer network of claim 22, wherein:
one of the node IDs of at least one set of the plurality of peers is associated with a first topology of the peer-to-peer network; and
another one of the node IDs of the at least one set of the plurality of peers is associated with a second topology different from the first topology.

24. The peer-to-peer network of claim 23, wherein the first and second peer nodes communicate via links established according to either or both of the first or second topologies.

25. A multiple topology peer-to-peer network with a plurality of peers, comprising:
a first peer node having a first node ID generated by a first node ID generating function and associated with first and second topologies of the peer-to-peer network, the first and second topologies being different from each other; and
a second peer node having a second node ID generated by the first node ID generating function and associated with the first and second topologies of the peer-to-peer network such that the first and second peer nodes communicate via links established according to either or both of the first or second topologies.

* * * * *